United States Patent
Brigandi et al.

(10) Patent No.: US 11,091,614 B2
(45) Date of Patent: Aug. 17, 2021

(54) MULTIPHASE CONDUCTIVE POLYMER COMPOSITE COMPOSITIONS

(71) Applicants: Union Carbide Corporation, Seadrift, TX (US); Rohm and Haas Company, Collegeville, PA (US)

(72) Inventors: Paul J. Brigandi, Collegeville, PA (US); Jeffrey M. Cogen, Collegeville, PA (US); John Reffner, Collegeville, PA (US)

(73) Assignees: Union Carbide Corporation, Seadrift, TX (US); Rohm and Haas Company, Collegeville, PA (US)

( * ) Notice: Subject to any disclaimer, the term of this patent is extended or adjusted under 35 U.S.C. 154(b) by 40 days.

(21) Appl. No.: 16/462,862

(22) PCT Filed: Nov. 13, 2017

(86) PCT No.: PCT/US2017/061241
§ 371 (c)(1),
(2) Date: May 21, 2019

(87) PCT Pub. No.: WO2018/097982
PCT Pub. Date: May 31, 2018

(65) Prior Publication Data
US 2020/0071510 A1 Mar. 5, 2020

Related U.S. Application Data

(60) Provisional application No. 62/425,759, filed on Nov. 23, 2016.

(51) Int. Cl.
| | | |
|---|---|---|
| *C08L 23/08* | (2006.01) | |
| *C08L 23/16* | (2006.01) | |
| *C08K 3/04* | (2006.01) | |
| *C08K 3/013* | (2018.01) | |
| *C08L 23/26* | (2006.01) | |

(52) U.S. Cl.
CPC .......... *C08L 23/0815* (2013.01); *C08K 3/013* (2018.01); *C08K 3/041* (2017.05); *C08K 3/042* (2017.05); *C08L 23/0869* (2013.01); *C08L 23/16* (2013.01); *C08L 23/26* (2013.01); *C08K 2201/001* (2013.01); *C08L 2203/202* (2013.01); *C08L 2205/035* (2013.01)

(58) Field of Classification Search
CPC .. C08L 23/0815; C08L 23/0846; C08L 23/04; C08L 23/0869; C08L 23/16; C08L 23/26; C08L 2205/035; C08L 2203/202; C08K 3/042; C08K 3/041; C08K 3/013; C08K 3/04; C08K 2201/001
See application file for complete search history.

(56) References Cited

U.S. PATENT DOCUMENTS

| | | |
|---|---|---|
| 3,225,018 A | 12/1965 | Zutty |
| 3,646,155 A | 2/1972 | Scott |
| 4,574,133 A | 3/1986 | Umpleby |
| 6,048,935 A | 4/2000 | Penfold et al. |
| 6,331,597 B1 | 12/2001 | Drumright et al. |
| 6,420,485 B1 | 7/2002 | Suzuki et al. |
| 2005/0064177 A1 | 3/2005 | Lee et al. |
| 2008/0226918 A1 | 9/2008 | Lee et al. |
| 2012/0172510 A1* | 7/2012 | Esseghir et al. ........ C08L 23/02 524/264 |
| 2019/0017983 A1* | 1/2019 | Smith .................. G01N 1/2214 |

* cited by examiner

*Primary Examiner* — Irina S Zemel
(74) *Attorney, Agent, or Firm* — Quarles & Brady LLP (57) ABSTRACT

A composition comprises a ternary-phase polymer composite including components (A) ethylene/unsaturated ester copolymers having $\gamma^p$ of from <5 to >1 mN/m; at least two additional polymers selected from the group consisting of: (B) non-polar polymers having $\gamma^p$ of from >0 to <1 mN/m selected from the group consisting of polyethylene homopolymers, silane-functionalized polyethylene homopolymers, ethylene/alpha-olefin copolymers, and silane-functionalized ethylene/alpha-olefin copolymers, (C) ethylene/unsaturated ester copolymers having a $\gamma^P$ of >5 mN/m, and (D) EPDM copolymers; and conductive filler dispersed in only one of (A) and the at least two additional polymers, wherein (i) one of the at least two additional polymers is selected from (B) and the other is selected from (C) or (D), or (ii) one of the at least two additional polymers is selected from (C) and the other is selected from (B) or (D).

13 Claims, 1 Drawing Sheet

MULTIPHASE CONDUCTIVE POLYMER COMPOSITE COMPOSITIONS

BACKGROUND

Generally, single polymer systems require a substantial concentration of conductive filler to achieve significant electrical conductivity, e.g., on the order of $10^{-9}$ to $10^{-3}$ S/cm. Such substantial concentrations of conductive filler increase the melt viscosity of the material while also decreasing the mechanical properties of the material. One approach to increase composite conductivity at reduced filler concentrations, and thereby minimize detrimental impact on mechanical and rheological properties, is to use multiphase polymer blends that can reduce the percolation threshold. For the case of a two-component polymer blend, several studies found the percolation threshold can be reduced using two phase polymer blends where the conductive filler was incorporated into immiscible polymer blends and is governed by the percolation of the conductive filler-rich phase and the continuity of this phase in the polymer blend.

The use of ternary polymer blends, i.e., three-component polymer blends, in combination with conductive filler, e.g., carbon black, has also been shown to reduce the percolation threshold and achieve conductivity in a few different polymer systems. Such ternary polymer blends, however, still show significant brittleness. Depending on the use, the brittleness may be improved at the cost of an increased percolation threshold.

A polymer composite composition using crosslinkable polymers and showing improved, i.e., lower, percolation threshold and improved, i.e., lower, brittleness is needed. Further, such a composite composition showing improved, i.e., lower, melting point and glass transition temperature, as well as improved, i.e., increased, flexibility, is needed, particularly for cable applications.

SUMMARY OF THE INVENTION

The disclosure provides a composition comprising: a ternary-phase polymer composite comprising components:
(A) at least one copolymer of ethylene with an unsaturated ester having a polar component of the surface tension ($\gamma^P$) of from less than or equal to 5 milliNewtons per meter (mN/m) to greater than or equal to 1 mN/m;
at least two additional polymers selected from the group consisting of:
(B) at least one non-polar polymer having a polar component of the surface tension ($\gamma^P$) of from greater than or equal to 0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers;
(C) at least one copolymer of ethylene with an unsaturated ester having a polar component of the surface tension ($\gamma^P$) of greater than 5 mN/m; and
(D) at least one ethylene propylene diene monomer copolymer; and
a conductive filler dispersed in only one of Component (A) and the at least two additional polymers,
wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

In another embodiment, the disclosure provides a cable comprising a conductor, an inner semiconducting layer covering at least a portion of the conductor; an insulation layer covering at least a portion of the inner semiconducting layer; and an outer semiconducting layer covering t least a portion of the insulation layer, wherein at least one of the inner and outer semiconducting layers comprises a ternary-phase polymer composite comprising components
(A) at least one copolymer of ethylene with an unsaturated ester having a polar component of the surface tension ($\gamma^P$) of from less than or equal to 5 milliNewtons per meter (mN/m) to greater than or equal to 1 mN/m;
at least two additional polymers selected from the group consisting of:
(B) at least one non-polar polymer having a polar component of the surface tension ($\gamma^P$) of from greater than or equal to 0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers;
(C) at least one copolymer of ethylene with an unsaturated ester having a polar component of the surface tension ($\gamma^P$) of greater than 5 mN/m; and
(D) at least one ethylene propylene diene monomer copolymer; and
a conductive filler dispersed in only one of Component (A) and the at least two additional polymers,
wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

DETAILED DESCRIPTION

In an embodiment, the disclosure provides a composition comprising a ternary-phase polymer composite comprising components: (A) at least one copolymer of ethylene with an unsaturated ester having a polar component of the surface tension ($\gamma^P$) of from less than or equal to 5 milliNewtons per meter (mN/m) to greater than or equal to 1 mN/m; at least two additional polymers selected from the group consisting of: (B) at least one non-polar polymer having a polar component of the surface tension ($\gamma^P$) of from greater than or equal to 0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers; (C) at least one copolymer of ethylene with an unsaturated ester having a polar component of the surface tension ($\gamma^P$) of greater than 5 mN/m; and (D) at least one ethylene propylene diene monomer copolymer; and a conductive filler dispersed in only one of Component (A) and the at least two additional polymers, wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

Component A

In an embodiment, the ternary polymer composite comprises (A) at least one copolymer of ethylene with an unsaturated ester having a polar component of the surface tension ($\gamma^P$) of from less than or equal to 5 mN/m to greater than or equal to 1 mN/m ("Component (A)").

In an embodiment, the unsaturated ester is an alkyl acrylate or alkyl methacrylate. Preferably, the alkyl is a C1-C8 alkyl, and more preferably a C1-C4 alkyl. Preferred carboxylates are those containing from 2 to 8 carbon atoms, and more preferably 2 to 5 carbon atoms.

Exemplary acrylic and methacrylic acid esters are lauryl methacrylate; myristyl methacrylate; palmityl methacrylate; stearyl methacrylate; 3-methacryloxy-propyltrimethoxysilane; 30methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred.

In an embodiment, the amount of ester comonomer in Component (A) is from greater than or equal to 2 wt %, or from greater than or equal to 10 wt %, or from greater than or equal to 15 wt % to less than or equal to 55 wt %, or to less than or equal to 30 wt %.

In an embodiment, the density of Component (A) is from greater than or equal to 0.900 g/cc, or from greater than or equal to 0.920 g/cc to less than or equal to 0.990 g/cc, or to less than or equal to 0.970 g/cc.

In an embodiment, the melt index of Component (A) is from greater than or equal to 0.1 g/10 min, or from greater than or equal to 1 g/10 min, or from greater than or equal to 5 g/10 min to less than or equal to 100 g/10 min, or to less than or equal to 50 g/10 min, or to less than or equal to 21 g/10 min.

In an embodiment, the melting point of Component (A) is less than 166° C.

In an embodiment, Component (A) has a glass transition temperature (Tg) of less than 25° C.

Preferably, Component (A) is selected from the group consisting of ethylene-ethyl acrylate, ethylene-methyl acrylate, ethylene-butyl acrylate and combinations thereof.

In an embodiment, Component (A) may be a mixture of two or more copolymers of ethylene with an unsaturated ester having a polar component of the surface tension ($\gamma^P$) of from less than or equal to 5 mN/m to greater than or equal to 1 mN/m.

In an embodiment, Component (A) is present in the ternary polymer composite in an amount of from greater than 0 vol %, or from greater than or equal to 1 vol %, or from greater than or equal to 2.5 vol %, or from greater than or equal to 7.5 vol %, or from greater than or equal to 15 vol % to less than or equal to 40 vol %, or to less than or equal to 30 vol %, or to less than or equal to 25 vol %, based on the total volume of the composite.

Component B

In an embodiment, the ternary polymer composite comprises (B) at least one non-polar polymer having a polar component of the surface tension ($\gamma^P$) of from greater than or equal to 0 mN/m to less than 1 mN/m and selected from the group consisting of polyethylene homopolymers, silane-functionalized polyethylene homopolymers, an ethylene/alpha-olefin copolymers and silane-functionalized ethylene/alpha-olefin copolymers ("Component (B)").

In an embodiment, Component (B) is a polyethylene homopolymer. Preferably, the polyethylene homopolymer is a low density polyethylene (LDPE), a very low density polyethylene (VLDPE), a linear low density polyethylene (LLDPE), a medium density polyethylene (HDPE) or a high density polyethylene (HDPE).

LDPEs are known in the art and commercially available. Typically LDPEs have a density of from greater than or equal to 0.910 g/cc to less than or equal to 0.940 g/cc.

VLDPEs are known in the art and commercially available. Typically, VLDPEs have a density of from greater than or equal to 0.860 g/cc to less than or equal to 0.915 g/cc.

LLDPEs are known in the art and commercially available. Typically, LLDPEs have a density of from greater than or equal to 0.916 g/cc to less than or equal to 0.925 g/cc.

MDPEs are known in the art and commercially available. Typically, MDPEs have a density of from greater than or equal to 0.925 g/cc to less than or equal to 0.940.

HDPEs are known in the art and commercially available. Typically have a density of greater than or equal to 0.940 g/cc to less than or equal to 0.970 g/cc.

In an embodiment, Component (B) is an ethylene/alpha-olefin copolymer.

Alpha-olefins are hydrocarbon molecules or a substituted hydrocarbon molecules (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 3 carbon atoms, preferably of 3 to 20 carbon atoms, in some cases preferably of 4 to 10 carbon atoms and in other cases preferably of 4 to 8 carbon atoms. Nonlimiting examples of α-olefins from which the copolymers are prepared include propylene, 1-butene, 1-pentene, 1-hexene, 1-octene, 1-dodecene, and mixtures of two or more of these monomers In an embodiment, the ethylene/alpha-olefin copolymer is preferably an ethylene/propylene, ethylene/1-butene, ethylene/1-hexene, or ethylene/1-octene copolymer, and more preferably an ethylene/propylene, ethylene/1-butene, ethylene/1-hexene or ethylene/l-octene bipolymer.

In an embodiment, ethylene/alpha-olefins suitable for use in the present disclosure comprises greater than 50 mol % polymerized ethylene monomer, based on the total amount of polymerizable monomer, and at least one alpha-olefin comonomer.

In an embodiment, the polyethylene homopolymer or ethylene/alpha-olefin copolymer is functionalized with silane. Such silane-functionalized polymers can be made either by copolymerization with a vinyl silane monomer or by one of many methods for grafting a silane-containing molecule to the backbone of the polymer change. Examples of such techniques are disclosed in U.S. Pat. Nos. 3,646,155; 6,420,485; 6,331,597; 3,225,018; 4,574,133; or 6,048,935, all of which are incorporated herein by reference. Examples of silane compound which may be used to add silane functionality to a polyethylene homopolymer or ethylene/alpha-olefin copolymer include, but are not limited to, vinyl silanes, e.g., vinyltrialkoxysilane. Typically, the amount of silane is generally from greater than 0 wt % to less than or equal to 5 wt % based on the total weight of the polyethylene homopolymer or ethylene/alpha-olefin copolymer.

In an embodiment, Component (B) is a silane-functionalized polyethylene homopolymer or a silane-functionalized ethylene/alpha-olefin copolymer. In an embodiment, Component (B) is a silane-functionalized polyethylene homopolymer or a silane-functionalized ethylene/alpha-olefin copolymer and is crosslinked.

In an embodiment, Component (B) is a silane-grafted polyethylene homopolymer or a silane-grafted ethylene/alpha-olefin copolymer. In an embodiment, Component (B) is a silane-grafted polyethylene homopolymer or a silane-grafted ethylene/alpha-olefin copolymer and is crosslinked.

Preferably, Component (B) is selected from the group consisting of polyethylene homopolymer, silane-functionalized polyethylene homopolymer, and combinations thereof. More preferable, Component (B) is selected from the group consisting of LDPE, silane-functionalized LDPE, and combinations thereof.

In an embodiment, Component (B) has a polar component of the surface tension ($\gamma^P$) of less than 1 mN/m, or less than or equal to 0.5 mN/m, or less than 0.5 mN/m, or 0.0 mN/m.

In an embodiment, Component (B) has a melting point of less than 166° C.

In an embodiment, Component (B) has a glass transition temperature (Tg) of less than 25° C.

In an embodiment, Component (B) may be a mixture of two or more non-polar polymers having a polar component of the surface tension ($\gamma^P$) of from greater than or equal to 0 mN/m to less than 1 mN/m and selected from the group consisting of polyethylene homopolymers, silane-functionalized polyethylene homopolymers, an ethylene/alpha-olefin copolymers and silane-functionalized ethylene/alpha-olefin copolymers.

In an embodiment, Component (B) is present in an amount of from 0 vol %, or from greater than 0 vol %, or from greater than or equal to 30 vol %, or from greater than or equal to 35 vol %, or from greater than or equal to 40 vol % to less than or equal to 50 vol %, or to less than or equal to 49 vol %, or to less than or equal to 48 vol %, or to less than or equal to 45 vol %, or to less than or equal to 42 vol %, based on the total volume of the composite.

Component C

In an embodiment, the ternary polymer composite comprises (C) at least one copolymer of ethylene with an unsaturated ester having a polar component of the surface tension ($\gamma^P$) of greater than 5 mN/m, or greater than or equal to 6 mN/m, or greater than or equal to 7 mN/m, or greater than or equal to 8 mN/m ("Component (C)").

In an embodiment, the copolymers of ethylene with an unsaturated ester useful in the present disclosure comprise from greater than or equal to 5 wt %, or from greater than or equal to 10 wt %, or from greater than or equal to 15 wt %, or from greater than or equal to 20 wt % to less than or equal to 50 wt %, or to less than or equal to 40 wt %, or to less than or equal to 35 wt %, or to less than or equal to 30 wt % of one or more unsaturated esters, based on the total weight of the copolymer.

In an embodiment, the unsaturated esters useful in the present disclosure include, and are not limited to, vinyl acetate, ethyl acrylate, and butyl acrylate. Preferably, the unsaturated ester is vinyl acetate.

In an embodiment, the melting point of Component (C) is less than 166° C.

In an embodiment, the glass transition temperature (Tg) is less than 25° C.

In an embodiment, Component (C) is crosslinked.

In an embodiment, Component (C) may be a mixture of two or more copolymers of ethylene with an unsaturated ester having a polar component of the surface tension ($\gamma^P$) of greater than 5 mN/m, or greater than or equal to 6 mN/m, or greater than or equal to 7 mN/m, or greater than or equal to 8 mN/m.

In an embodiment, Component (C), i.e., the copolymer of ethylene with an unsaturated ester, is present in an amount of from 0 vol %, or from greater than 0 vol %, or from greater than or equal to 30 vol %, or from greater than or equal to 35 vol %, or from greater than or equal to 40 vol % to less than or equal to 50 vol %, or to less than or equal to 49 vol %, or to less than or equal to 48 vol %, or to less than or equal to 45 vol %, or to less than or equal to 42 vol %, based on the total volume of the composite.

Component D

In an embodiment, the ternary polymer composite comprises (D) at least one ethylene propylene diene monomer (EPDM) copolymer. Preferably, the at least one EPDM copolymer is an EPDM terpolymer ("Component (D)").

In an embodiment, the EPDM copolymer comprises units derived from ethylene, units derived from propylene, and units derived from at least one conjugated diene or nonconjugated diene.

Exemplary conjugated dienes useful in EPDM copolymers of the present disclosure include, for example, butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, headiene-1,3, 4-methylpentadiene-1,3, 1,3-pentadiene ($CH_3CH{=}CH{-}CH{=}CH_2$; commonly called piperylene), 3-methyl-1,3-pentadiene, 2,4dimethyl-1,3-pentadiene, 3-ethyl-1,3-pentadiene. Preferred conjugated dienes include butadiene and isoprene.

Exemplary nonconjugated dienes useful in EPDM copolymers of the present disclosure include, for example, aliphatic dienes such as 1,4-pentadiene, 1,4-headiene, 1,5-hexadiene, 2-methyl-1,5-hexadiene, 1,6-heptadiene, 6-methyl-1,5-heptadiene, 1,6-octadiene, 1,7-octadene, 7-methyl-1,6-octadiene, 1,13-tetradecadiene, 1,19-eicosadiene; cyclic dienes such as 1,4-cyclohexadiene, bicyclo[2.2.1]hept-2,5diene, 5-ethylidene-2-noboronene, 5-methylene-2-norbornene, 5-vinyl-2-norbornene, bicycle[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, methyltetrahydroindene, 5-allylbicyclo[2.2.1]hept-2-ene, and 1,5-cyclooctadiene; aromatic dienes such as 1,4-diallylbenzene and 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene and 1,4,9-decatriene. Preferred nonconjugated dienes include dicyclopentadiene (DCPD), ethylidene norbornene (ENB), and vinyl norbornene (VNB).

Preferably, the diene is a nonconjugated diene. Preferably, the diene is a nonconjugated diene selected from the group consisting of DCPD, ENB, and VNB.

Generally, EPDM copolymers comprises from greater than or equal to 30 wt %, or from greater than or equal to 40 wt %, or from greater than or equal to 50 wt % to less than or equal to 80 wt %, or to less than or equal to 70 wt %, or to less than or equal to 60 wt % units derived from ethylene; from greater than or equal to 15 wt %, or from greater than or equal to 20 wt %, or from greater than or equal to 25 wt % to less than or equal to 60 wt %, or to less than or equal to 55 wt %, or to less than or equal to 50 wt % units derived from propylene; and from greater than 0 wt %, or from greater than or equal to 0.1 wt %, or from greater than or equal to 0.5 wt % to less than or equal to 10 wt %, or to less than or equal to 5 wt %, or to less than or equal to 2 wt % units derived from one or more dienes, e.g., conjugated or nonconjugated dienes, based on the total weight of the EPDM copolymer.

In a preferred embodiment, the EPDM copolymer has a polar component of the surface tension ($\gamma^P$) of greater than 5 mN/m, or greater than or equal to 5.1 mN/m, or greater than or equal to 5.2 mN/m, or greater than or equal to 5.3 mN/m.

In an embodiment, the melting temperature of Component (D) is less than 166° C.

In an embodiment, the glass transition temperature (Tg) of Component (D) is less than 25° C.

In an embodiment, Component (D) is crosslinked.

In an embodiment, Component (D) may be a mixture of two or more ethylene propylene diene monomer (EPDM) copolymers.

In an embodiment, Component (D), i.e., the EPDM copolymer, is present in an amount of from 0 vol %, or from greater than 0 vol %, or from greater than or equal to 30 vol %, or from greater than or equal to 35 vol %, or from greater than or equal to 40 vol % to less than or equal to 50 vol %, or to less than or equal to 49 vol %, or to less than or equal to 48 vol %, or to less than or equal to 45 vol %, or to less than or equal to 42 vol %, based on the total volume of the composite.

Conductive Filler

In an embodiment, a conductive filler is dispersed in only one of the components of the ternary-phase polymer composite, i.e., only one of Components (A), (B), (C) and (D). Preferably, the conductive filler is dispersed in Component (A).

In an embodiment, the conductive filler is selectively dispersed in the only one component of the ternary-phase polymer composite. That is, in an embodiment, the conductive filler is purposefully and intentionally pre-mixed with only one component of the ternary-phase polymer composite so as to be dispersed in only that one component in the final composition.

In an embodiment, the Components (A), (B), (C) and (D). in which the conductive filler is not dispersed are essentially free of conductive filler. For example, if the conductive filler is dispersed in Component (A), the remaining two components selected from Components (B), (C) and (D) are essentially free of conductive filler. As used herein, "essentially free of conductive filler" means that the Components other than the Component comprising the conductive filler each comprise less than or equal to 0.5 vol %, or less than or equal to 0.25 vol %, or less than or equal to 0.1 vol %, or less than or equal to 0.05 vol % of the conductive filler, based on the total volume of the Component.

The conductive filler can be a conventional carbon black commonly used in semiconductive shields. Other conductive fillers useful in the present disclosure include carbon fullerenes (preferably carbon nanotubes), graphite, graphene, other metallic particles, and conductive polymers, e.g., polyacetylene, polyparaphenylene, polypyrrole, polythiophene, and polyaniline. Preferably, the conductive filler is selected from the group consisting of carbon black, carbon nanotubes, graphite, graphene and combinations thereof. Most preferably, the conductive filler is carbon black.

Representative carbon blacks useful in the present disclosure may have an average particle size of greater than 0 to less than or equal to 100 nanometers (nm), preferably to less than or equal to 50 nm. In an embodiment, the carbon blacks useful in the present disclosure have a surface area (BET) of from greater than or equal to 700 m$^2$/g to less than or equal to 1250 m$^2$/g, or from greater than or equal to 700 m$^2$/g to less than or equal to 900 m$^2$/g. In an embodiment, the carbon blacks useful in the present disclosure have an oil absorption (dibutyl phthalate or DBP) of from greater than or equal to 200 ml/100 g to less than or equal to 600 ml/100 g, or from greater than or equal to 300 ml/100 g to less than or equal to 500 ml/100 g.

In an embodiment, AKZO Ketjenblack EC300J is a suitable carbon black for use in the present disclosure with a particle size of about 35 nm or less, a surface area (BET) of about 750 to 850 m$^2$/g, and an oil absorption of about 300 to 400 ml/100 g.

In an embodiment, the conductive filler is present in the ternary polymer composite in an amount of from greater than 0 vol %, or from greater than or equal to 0.25 vol %, or from greater than or equal to 0.5 vol %, or from greater than or equal to 1 vol %, or from greater than or equal to 1.5 vol %, or from greater than or equal to 2 vol %, or from greater than or equal to 3 vol %, or from greater than or equal to 5 vol %, or from greater than or equal to 10 vol % to less than or equal to 30 vol %, or to less than or equal to 20 vol %, or to less than or equal to 15 vol %, or to less than or equal to 12 vol %, based on the total volume of the composite.

Composition

The disclosure provides a composition comprising a ternary-phase polymer composite comprising components (A) at least one copolymer of ethylene with an unsaturated ester having a polar component of the surface tension ($\gamma^P$) of from less than or equal to 5 mN/m to greater than or equal to 1 mN/m; at least two additional polymers selected from the group consisting of: (B) at least one non-polar polymer having a polar component of the surface tension ($\gamma^P$) of from greater than or equal to 0.0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers; (C) at least one copolymer of ethylene with an unsaturated ester having a polar component of the surface tension ($\gamma^P$) of greater than 5 mN/m; and (D) at least one ethylene propylene diene monomer copolymer; and a conductive filler dispersed in only one of Component A and the at least two additional polymers, wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

In an embodiment, the composition comprises a ternary-phase polymer composite comprising Components (A), (B) and (C); or Components (A), (B) and (D); or Components (A), (C) and (D). In an embodiment, the ternary-phase polymer composite comprises a conductive filler dispersed in Component (A).

In an embodiment, the composition comprises a ternary-phase polymer composite comprising Components (A), (B) and (C), wherein the conductive filler is dispersed in Component (A).

In an embodiment, the composition comprises a ternary-phase polymer composite comprising Components (A), (B) and (C), wherein the conductive filler is dispersed in Component (B).

In an embodiment, the composition comprises a ternary-phase polymer composite comprising Components (A), (B) and (C), wherein the conductive filler is dispersed in Component (C).

In an embodiment, the composition comprises a ternary-phase polymer composite comprising Components (A), (B) and (D), wherein the conductive filler is dispersed in Component (A).

In an embodiment, the composition comprises a ternary-phase polymer composite comprising Components (A), (B) and (D), wherein the conductive filler is dispersed in Component (B).

In an embodiment, the composition comprises a ternary-phase polymer composite comprising Components (A), (B) and (D), wherein the conductive filler is dispersed in Component (D).

In an embodiment, the composition comprises a ternary-phase polymer composite comprising Components (A), (C) and (D), wherein the conductive filler is dispersed in Component (A).

In an embodiment, the composition comprises a ternary-phase polymer composite comprising Components (A), (C) and (D), wherein the conductive filler is dispersed in Component (C).

In an embodiment, the composition comprises a ternary-phase polymer composite comprising Components (A), (C) and (D), wherein the conductive filler is dispersed in Component (D).

In an embodiment, the composition comprises Components (A), (B) and (C), wherein Component (B) is a polyethylene homopolymer or a silane-grafted polyethylene homopolymer. In an embodiment, the composition comprises Components (A), (B) and (D), wherein Component (B) is a polyethylene homopolymer or a silane-functionalized polyethylene homopolymer.

In an embodiment, the disclosure provides a composition comprising a ternary-phase polymer composite comprising components (A) at least one copolymer of ethylene with an unsaturated ester having a polar component of the surface tension ($\gamma^P$) of from less than or equal to 5 mN/m to greater than or equal to 1 mN/m; at least two additional polymers selected from the group consisting of: (B) at least one non-polar polymer having a polar component of the surface tension ($\gamma^P$) of from greater than or equal to 0.0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers; (C) at least one copolymer of ethylene with an unsaturated ester having a polar component of the surface tension ($\gamma^P$) of greater than 5 mN/m; and (D) at least one ethylene propylene diene monomer copolymer; and a conductive filler dispersed in only one of Component A and the at least two additional polymers, wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D), and the ternary-phase polymer composite is a multiphase composite, i.e., each of the three polymer components is present as its own phase.

In an embodiment, the composition includes one or more additives. Such additives can be added to the composition before, during and/or after processing. The amount of additive is usually in the range of about 0.01 wt % to about 3 wt % based on the total weight of the composition. Useful additives include additional antioxidants, crosslinking agents including organic peroxides, cure boosters, co-agents, scorch-retardants and silanes.

In an embodiment, the composition has a conductivity as defined as the log of the volume resistivity in ohm-cm versus the percent conductive filler loading (vol %) of less than 9, or less than 7, or less than 5, or less than 4, or less than 3.

In an embodiment, the composition does not exhibit brittle break at room temperature.

In an embodiment, the composition includes at least one crosslinked component, i.e., at least one of Component (B), Component (C) and Component (D) is present in the composition and is crosslinked.

Method of Forming the Composition

In an embodiment, the disclosure provides a method of forming a composition comprising a ternary-phase polymer composite comprising components (A) at least one copolymer of ethylene with an unsaturated ester having a polar component of the surface tension ($\gamma^P$) of from less than or equal to 5 mN/m to greater than or equal to 1 mN/m; at least two additional polymers selected from the group consisting of: (B) at least one non-polar polymer having a polar component of the surface tension ($\gamma^P$) of from greater than or equal to 0.0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers; (C) at least one copolymer of ethylene with an unsaturated ester having a polar component of the surface tension ($\gamma^P$) of greater than 5 mN/m; and (D) at least one ethylene propylene diene monomer copolymer; and a conductive filler dispersed in only one of Component (A) and the at least two additional polymers, wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

In an embodiment, Component (A) and the at least two additional polymers are melt-blended together with the conductive filler. Particularly, in an embodiment, the method comprises melt-blending (A) at least one copolymer of ethylene with an unsaturated ester having a polar component of the surface tension ($\gamma^P$) of from less than or equal to 5 mN/m to greater than or equal to 1 mN/m; at least two additional polymers selected from the group consisting of: (B) at least one non-polar polymer having a polar component of the surface tension ($\gamma^P$) of from greater than or equal to 0.0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers; (C) at least one copolymer of ethylene with an unsaturated ester having a polar component of the surface tension ($\gamma^P$) of greater than 5 mN/m; and (D) at least one ethylene propylene diene monomer copolymer together with a conductive filler.

Preferably, the conductive filler is melt-blended with one of (A), (B), (C) and (D) to form a masterbatch. The masterbatch is then melt-blended with the remaining two components of (A), (B), (C) and (D). In an embodiment, the conductive filler is melt-blended with (A) to form a masterbatch. The masterbatch is then melt-blended with: (i) (B) and one of (C) or (D), or (ii) (C) and one of (B) or (D).

In an embodiment, the conductive filler is present in the masterbatch in an amount from greater than or equal to 10 wt %, or from greater than or equal to 15 wt %, or from greater than or equal to 20 wt %, or from greater than or equal to 25 wt %, or from greater than or equal to 30 wt % to less than or equal to 50 wt %, or to less than or equal to 40 wt %, or to less than or equal to 35 wt %.

Optionally, additional additives may be added before, during or after melt-blending.

Cable

The present disclosure also provides for a cable, such as a power cable, comprising a layer (e.g., semiconducting layer) comprising a composite composition as described herein.

In one embodiment, the present disclosure provides for a cable, such as a power cable, comprising a conductor, and a semiconducting layer covering at least a portion of the conductor, the semiconducting layer comprising a composite composition as described herein. Preferably, the cable comprises a conductor, an inner semiconducting layer covering at least a portion of the conductor, an insulating layer covering at least a portion of the inner semiconducting layer, and an outer semiconducting layer covering at least a portion of the insulating layer, wherein at least one of the inner and outer semiconducting layers comprise a composite composition as described herein.

In an embodiment, the inner and/or outer semiconducting layer comprises a composition comprising a ternary-phase polymer composite comprising components (A) at least one copolymer of ethylene with an unsaturated ester having a polar component of the surface tension ($\gamma^P$) of from less than or equal to 5 mN/m to greater than or equal to 1 mN/m; at least two additional polymers selected from the group consisting of: (B) at least one non-polar polymer having a polar component of the surface tension ($\gamma^P$) of greater than or equal to 0.0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers; (C) at least one copolymer of ethylene with an unsaturated ester having a polar component of the surface tension ($\gamma^P$) of greater than 5 mN/m; and (D) at least one ethylene propylene diene monomer copolymer; and a conductive filler dispersed in only one of Component (A) and the at least two additional polymers, wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

In an embodiment, the present disclosure provides a method of conducting electricity, the method comprising applying voltage across a cable as disclosed herein.

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term copolymer as defined hereinafter. Trace amounts of impurities, for example, catalyst residues, may be incorporated into and/or within the polymer. The term "copolymer," as used herein, refers to polymers prepared by the polymerization of at least two different types of monomers. The generic term copolymer thus includes bipolymers (employed to refer to polymers prepared from two different types of monomers), and polymers prepared from more than two different types of monomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed. The term "or," unless stated otherwise, refers to the listed members individual as well as in any combination. Use of the singular includes use of the plural and vice versa.

Test Methods

Low Resistance (<$10^8$ Ohm ($\Omega$)) Measurements:

Low resistance measurements are conducted using a Keithley 2700 Integra Series digital multimeter with 20point probe. At least two samples (101.6 mm long by 50.8 mm wide by 1.9 mm thick) are tested for each formulation. The electrical resistivities of the polymer composites are obtained from compression molded samples. Silver paint (conductive silver #4817N) is applied to minimize contact resistance between the samples and electrodes.

High Resistance (>$10^8\Omega$) Measurements:

High resistance measurements are conducted using a Keithley Model 6517B electrometer high resistance meter and Model 8009 resistivity test chamber with circular disk samples of 76.2 mm diameter and 1.9 mm thickness.

Volume Resistivity:

Brittleness:

The brittleness of the composites is tested by bending a rectangular specimen 25.4 mm wide and 203.2 mm long under load until the ends meet.

Experimental

The polymers, compositions and processes of this disclosure, and their use, are more fully described by the following examples. The following examples are provided for the purpose of illustrating the disclosure, and are not to be construed as limiting the scope of the invention.

Materials

PP: polypropylene homopolymer (MFR ($I_{2.16}$) @ 230° C.=1.8 g/10 min; density=0.935 g/cc)

PMMA: poly(methyl methacrylate) (MFR ($I_{2.16}$) @ 230° C.=12.1 g/10 min; density=1.180 g/cc)

EAA-CB: ethyl acrylic acid/carbon black masterbatch

EAA: ethyl acrylic acid (MFR ($I_{2.16}$) @ 230° C.=8.5 g/10 min; density=0.938 g/cc)

Si-LDPE: ethylene-vinyltrimethoxysilane copolymer (MFR ($I_{2.16}$) @ 230° C.=1.5 g/10 min; density=0.920 g/cc)

EPDM: ethylene propylene diene monomer rubber; a hydrocarbon rubber that is semi-crystalline with a diene level of 0.9 wt %, based on the weight of the EPDM (Mooney viscosity @ 125° C.=18)

LDPE: low density polyethylene (MFR ($I_{2.16}$) @ 230° C.=2.3 g/10 min; density=0.920 g/cc)

EVA: ethylene-vinyl acetate (MFR ($I_{2.16}$) @ 230° C.=3.0 g/10 min; density=0.956 g/cc)

EEA: ethylene-ethyl acrylate (MFR ($I_{2.16}$) @ 230° C.=20 g/10 min; density=0.930 g/cc)

EEA-CB: ethylene-ethyl acrylate/carbon black masterbatch

The surface energy data for the polymers listed above is provided in Table 1, below.

TABLE 1

Surface Energy Data

| | Surface Energy (mN/m) | | |
|---|---|---|---|
| | Total ($\gamma$) | Dispersive Forces ($\gamma^d$) | Polar Forces ($\gamma^p$) |
| PP | 37.7 | 37.7 | 0.0 |
| LDPE | 37.0 | 37.0 | 0.0 |
| Ethylene-alpha olefin* | 35.7 | 35.7 | 0.0 |
| Si-LDPE | 37.8 | 37.3 | 0.5 |
| EAA | 40.5 | 39.4 | 1.1 |
| EEA | 34.8 | 32.5 | 2.3 |
| EPDM | 26.5 | 21.1 | 5.3 |
| EVA | 39.2 | 30.5 | 8.7 |
| PMMA* | 41.1 | 29.6 | 11.5 |

*D. W. van Krevelen & Klaas te Nijenhuis, *Properties of Polymers: Their Correlation with Chemical Structure; Their Numerical Estimation and Prediction from Additive Group Contributions*, p. 240 (4 ed. Revised 2009)

Comparative Examples 1-6 are prepared having the formulations as set forth in Table 2, below. The comparative PP/PMMA/(EAA-CB) composites are prepared similar to the known prior art methods and are used to show the brittleness of prior art systems. The conductive carbon black (CB) is pre-mixed within the EAA polymer phase to form the EAA-CB masterbatch with a CB content of 9.3 vol % based on the total volume of the masterbatch. The masterbatch is prepared by melt-mixing using a 250 cc internal C.W. Brabender batch pre-mixer. The EAA polymer and CB are laded directly to the mixing bowl of the batch pre-mixer and compounded at 60 rpm for 10 minutes at 130° C. The EAA-CB masterbatch is combined with the other two polymers in the batch pre-mixer and mixed at 190° C. at 60 rpm for 5 minutes. The samples are then removed. The composites are then compression molded into 8 inch by 8 inch by 0.075 inch plaques. The polymer composites are compression molded at 135° C. and 3.45 MPa for 5 minutes. After 5 minutes, the pressure is increased to 17 MPa followed by thermal annealing at 190° C. for 30 minutes. The samples are then cooled to 30° C. and removed from the press.

Comparative Examples 7-10 are prepared having the formulations as set forth in Table 1, below using a method similar to that used to make Comparative Examples 1-6. EAA-CB masterbatch is prepared as described for comparative examples 1-6 and then mixed with EEA to prepare the single phase composites. The EAA-CB masterbatch and EEA are melt-mixed at 135° C. and 40 rpm for 5 minutes. The samples are then removed. The composites are compression molded into 8 inch by 8 inch by 0.075 inch plaques. The polymer composites are compression molded at 135° C. and 3.45 MPa for 5 minutes. After 5 minutes, the pressure is increased to 17 MPa followed by thermal annealing at 135° C. for 15 minutes. The samples are then cooled to 30° C. and removed from the press.

Inventive Examples 1-16 are prepared having the formulations as set forth in Table 1, below. For the inventive examples, the conductive carbon black is pre-mixed with the EAA polymer phase to form the EEA-CB masterbatch with a CB content of 20 vol %, based on the total volume of the masterbatch. The masterbatch is prepared by melt-mixing using a 250 cc internal C.W. Brabender batch pre-mixer. The EEA and CB are loaded directly to the mixing bowl of the batch pre-mixer and compounded at 60 rpm for 10 minutes at 130° C. The masterbatch is combined with the other two polymers in the batch pre-mixer and mixed at 135° C. at 40 rpm for 5 minutes. The samples are then removed. The composites are then compression molded into 8 inch by 8 inch by 0.075 inch plaques. The polymer composites are compression molded at 135° C. and 3.45 MPa for 5 minutes. After 5 minutes, the pressure is increased to 17 MPa followed by thermal annealing at 135° C. for 15 minutes. The samples are then cooled to 30° C. and removed from the press.

TABLE 2

Formulations of Comparative and Inventive Examples

| | PP | PMMA | EAA-CB | EEA | Si-LDPE | EPDM | LDPE | EVA | EEA-CB |
|---|---|---|---|---|---|---|---|---|---|
| CE1 | 48.75 | 48.75 | 2.50 | | | | | | |
| CE2 | 47.25 | 47.25 | 5.50 | | | | | | |
| CE3 | 45.75 | 45.75 | 8.50 | | | | | | |
| CE4 | 44.50 | 44.50 | 11.00 | | | | | | |
| CE5 | 42.00 | 42.00 | 16.00 | | | | | | |
| CE6 | 40.00 | 40.00 | 20.00 | | | | | | |
| CE7 | | | 2.50 | 97.50 | | | | | |
| CE8 | | | 10.00 | 90.00 | | | | | |
| CE9 | | | 20.00 | 80.00 | | | | | |
| CE10 | | | 40.00 | 60.00 | | | | | |
| IE1 | | | | | 48.75 | 48.75 | | | 2.50 |
| IE2 | | | | | 46.25 | 46.25 | | | 7.50 |
| IE3 | | | | | 42.50 | 42.50 | | | 15.00 |
| IE4 | | | | | 37.50 | 37.50 | | | 25.00 |
| IE5 | | | | | 48.75 | | | 48.75 | 2.50 |
| IE6 | | | | | 46.25 | | | 46.25 | 7.50 |
| IE7 | | | | | 42.50 | | | 42.50 | 15.00 |
| IE8 | | | | | 37.50 | | | 37.50 | 25.00 |
| IE9 | | | | | | 48.75 | 48.75 | | 2.50 |
| IE10 | | | | | | 46.25 | 46.25 | | 7.50 |
| IE11 | | | | | | 42.50 | 42.50 | | 15.00 |
| IE12 | | | | | | 37.50 | 37.50 | | 25.00 |

TABLE 2-continued

Formulations of Comparative and Inventive Examples

|      | PP | PMMA | EAA-CB | EEA | Si-LDPE | EPDM  | LDPE | EVA   | EEA-CB |
|------|----|------|--------|-----|---------|-------|------|-------|--------|
| IE13 |    |      |        |     |         | 48.75 |      | 48.75 | 2.50   |
| IE14 |    |      |        |     |         | 46.25 |      | 46.25 | 7.50   |
| IE15 |    |      |        |     |         | 42.50 |      | 42.50 | 15.00  |
| IE16 |    |      |        |     |         | 37.50 |      | 37.50 | 25.00  |

Figure 1:
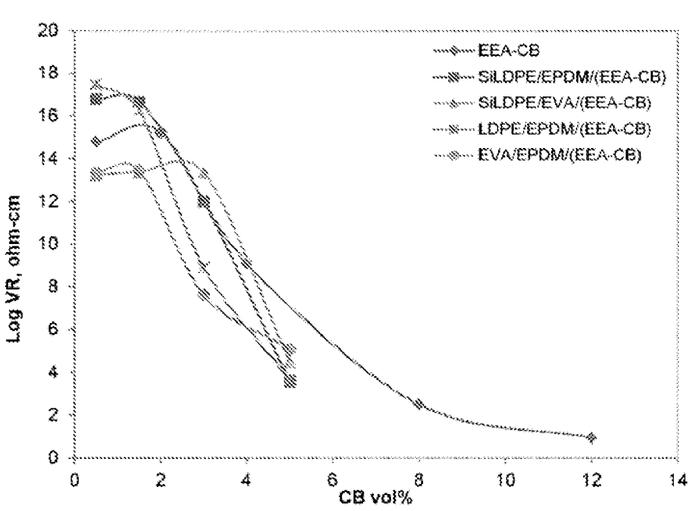
The FIGURE is a plot of the resistivity date for the comparative and inventive examples showing the percolation threshold.

The results for the composites (Comparative Examples and Inventive Examples) are shown in Table 3. Unlike Comparative Examples 1-6 (PP+PMMA+EAA-CB Masterbatch), the Inventive Examples exhibit a reduced percolation threshold and achieved conductivity at lower CB loading. The reduced percolation threshold is particularly visible in the FIG. 1. The Inventive Examples and Comparative Examples 7-10 are observed for breaks and cracks when placed under load. The results show that the Inventive Examples are improved over the prior art single polymer systems. Particularly, the Inventive Examples are improved over such prior art systems in terms of polymer systems that have a lower melting and glass transition temperature resulting in a more ductile/flexible system less susceptible to compared to that of the PP/PMMA system which have a melting point and glass transition temperatures that are above process limits and result in very brittle material not suitable for many applications.

TABLE 3

Composite Properties

|              |      | CB (vol %) | Log VR (ohm-cm) | Brittleness, Break at Bend |
|--------------|------|------------|-----------------|----------------------------|
| PP           | CE1  | 0.23       | 7.31            | Yes                        |
| PMMA         | CE2  | 0.51       | 4.61            |                            |
| (EAA-CB)     | CE3  | 0.79       | 3.16            |                            |
|              | CE4  | 1.03       | 2.89            |                            |
|              | CE5  | 1.49       | 2.50            |                            |
|              | CE6  | 1.87       | 2.32            |                            |
| EEA-         | CE7  | 0.5        | 14.78           | N/A                        |
| CB           | CE8  | 2.0        | 15.22           |                            |
|              | CE9  | 4.0        | 9.10            |                            |
|              | CE10 | 8.0        | 2.48            |                            |
| Si-LDPE      | IE1  | 0.5        | 16.78           | No                         |
| EPDM         | IE2  | 1.5        | 16.65           |                            |
| (EEA-CB)     | IE3  | 3.0        | 11.90           |                            |
|              | IE4  | 5.0        | 3.53            |                            |
| Si-LDPE      | IE5  | 0.5        | 13.22           | No                         |
| EVA          | IE6  | 1.5        | 13.36           |                            |
| (EEA-CB)     | IE7  | 3.0        | 13.35           |                            |
|              | IE8  | 5.0        | 4.48            |                            |
| LDPE         | IE9  | 0.5        | 17.46           | No                         |
| EPDM         | IE10 | 1.5        | 16.26           |                            |
| (EEA-CB)     | IE11 | 3.0        | 8.90            |                            |
|              | IE12 | 5.0        | 3.62            |                            |
| EVA          | IE13 | 0.5        | 13.33           | No                         |
| EPDM         | IE14 | 1.5        | 13.46           |                            |
| (EEA-CB)     | IE15 | 3.0        | 7.61            |                            |
|              | IE16 | 5.0        | 5.07            |                            |

The invention claimed is:

1. A composition comprising:
   a ternary-phase polymer composite comprising components:
   (A) at least one copolymer of ethylene with an unsaturated ester having a polar component of the surface tension ($\gamma^P$) of from less than or equal to 5 milliNewtons per meter (mN/m) to greater than or equal to 1 mN/m;
   at least two additional polymers selected from the group consisting of:
   (B) at least one non-polar polymer having a polar component of the surface tension ($\gamma^P$) of from greater than or equal to 0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers;
   (C) at least one copolymer of ethylene with an unsaturated ester having a polar component of the surface tension ($\gamma^P$) of greater than 5 mN/m; and
   (D) at least one ethylene propylene diene monomer copolymer; and
   a conductive filler dispersed in only Component (A),
   wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

2. The composition of claim 1, wherein Component (A) is selected from the group consisting of ethylene-ethyl acrylate, ethylene-methyl acrylate, ethylene-butyl acrylate and combinations thereof.

3. The composition of claim 2, wherein the conductive filler is selected from the group consisting of carbon black, carbon nanotubes, graphite, graphene and combinations thereof.

4. The composition of claim 3, wherein the ternary-phase polymer composite comprises
   a) Components (A), (B) and (C); or
   b) Components (A), (C) and (D); or
   c) Components (A), (B) and (D).

5. The composition of claim 4, wherein Component (B) is present and is selected from the group consisting of a polyethylene homopolymer and a silane-functionalized polyethylene homopolymer.

6. The composition of claim 5, wherein Component (A) is present in an amount of from greater than 0 vol % to less than or equal to 40 vol %, based on the total volume of the composite and
   a) Component B is present in an amount of from greater than 0 vol % to less than or equal to 50 vol %, based on the total volume of the composite, or
   b) Component C is present in an amount of from greater than 0 vol % to less than or equal to 50 vol %, based on the total volume of the composite, or
   c) Component D is present in an amount of from greater than 0 vol % to less than or equal to 50 vol %, based on the total volume of the composite.

7. The composition of claim 6, wherein the ternary-phase polymer composite comprises
   a) Components (A), (B) and (C), wherein Component (A) is selected from the group consisting of ethylene-ethyl acrylate, ethylene-methyl acrylate, ethylene-butyl acrylate and combinations thereof, and wherein Component (B) is selected from the group consisting of a polyethylene homopolymer and silane-functionalized polyethylene homopolymer, and wherein Component (C) is an ethylene-vinyl acetate having a polar component of the surface tension ($\gamma^P$) of greater than 5 mN/m; or b) Components (A), (C) and (D), wherein Component (A) is selected from the group consisting of ethylene-ethyl acrylate, ethylene-methyl acrylate, ethylene-butyl acrylate and combinations thereof, and wherein Component (D) is an EPDM terpolymer; or c) Components (A), (B) and (D), wherein Component (A) is selected from the group consisting of ethylene-ethyl acrylate, ethylene-methyl acrylate, ethylene-butyl acrylate and combinations thereof, and wherein Component (B) is selected from the group consisting of a polyethylene homopolymer and silane-functionalized polyethylene homopolymer, and wherein Component (D) is an EPDM terpolymer.

8. The composition of claim 1 wherein each of the at least two additional polymer contain less than or equal to 0.05 vol % of the conductive filler based on the total volume of each respective additional polymer.

9. The composition of claim 1 wherein the (C) is different than (A).

10. The composition of claim 9 wherein the composition exhibits no brittle break at room temperature.

11. A cable comprising an semiconducting layer comprising the composition of claim 7.

12. A cable comprising:
a conductor;
an inner semiconducting layer covering at least a portion of the conductor;
an insulation layer covering at least a portion of the inner semiconducting layer; and
an outer semiconducting layer covering at least a portion of the insulation layer;
wherein at least one of the inner and outer semiconducting layer comprises a ternary-phase polymer composite comprising components
(A) at least one copolymer of ethylene with an unsaturated ester having a polar component of the surface tension ($\gamma^P$) of from less than or equal to 5 milliNewtons per meter (mN/m) to greater than or equal to 1 mN/m;
at least two additional polymers selected from the group consisting of:
(B) at least one non-polar polymer having a polar component of the surface tension ($\gamma^P$) of from greater than or equal to 0 mN/m to less than 1 mN/m and selected from the group consisting of polyethylene homopolymers, silane-functionalized polyethylene homopolymers, ethylene/alpha-olefin copolymers, and silane-functionalized ethylene/alpha-olefin copolymers;
(C) at least one copolymer of ethylene with an unsaturated ester having a polar component of the surface tension ($\gamma^P$) of greater than 5 mN/m; and
(D) at least one ethylene propylene diene monomer copolymer; and
a conductive filler dispersed in only Component (A)
wherein (i) a first of the at least two additional polymers is selected from (B) and a second of the at least two additional polymers is selected from (C) or (D), or (ii) the first of the at least two additional polymers is selected from (C) and the second of the at least two additional polymers is selected from (B) or (D).

13. A method of conducting electricity, the method comprising applying voltage across the cable of claim 12.

* * * * *